US007567582B2

(12) United States Patent
Westhead et al.

(10) Patent No.: US 7,567,582 B2
(45) Date of Patent: Jul. 28, 2009

(54) BRANCH OFFICE DNS STORAGE AND RESOLUTION

(75) Inventors: Jeffrey J. Westhead, Duvall, WA (US); Levon A. Esibov, Redmond, WA (US); Nathan Daniel Muggli, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 572 days.

(21) Appl. No.: 11/208,166

(22) Filed: Aug. 19, 2005

(65) Prior Publication Data

US 2007/0041393 A1 Feb. 22, 2007

(51) Int. Cl.
*H04L 12/54* (2006.01)
(52) U.S. Cl. .................. 370/428; 370/465; 709/238
(58) Field of Classification Search .......... 370/428, 370/465; 709/238, 227
See application file for complete search history.

(56) References Cited

U.S. PATENT DOCUMENTS

| | | | |
|---|---|---|---|
| 6,397,246 B1 | 5/2002 | Wolfe | 709/217 |
| 6,584,497 B1 * | 6/2003 | Case et al. | 709/217 |
| 6,775,687 B1 * | 8/2004 | Binding et al. | 709/203 |
| 7,343,422 B2 * | 3/2008 | Garcia-Luna-Aceves et al. | 709/238 |
| 2004/0132451 A1 | 7/2004 | Butehorn et al. | 455/445 |
| 2005/0105524 A1 | 5/2005 | Stevens et al. | 370/389 |
| 2005/0108246 A1 | 5/2005 | Dillon | 707/10 |

* cited by examiner

Primary Examiner—Dang T Ton
Assistant Examiner—Wei Zhao
(74) Attorney, Agent, or Firm—Workman Nydegger

(57) ABSTRACT

Maintaining DNS records. A computing network system includes a local Domain Name Service (DNS) server connected to one or more local clients or resources at a local branch office in an enterprise network. The local DNS server advertises to the local clients or resources at the local branch office that the DNS server is authoritative. The DNS server receives record information for the local clients or resources. An attempt is made to forward the record information to an enterprise hub DNS server. The record information is stored persistently in a cache. Storing the record information persistently in cache may be performed selectively or non-selectively. When performed selectively, the record information is stored or not stored depending on some result or other action. For example, the result may be stored or not stored depending on the results of attempting to forward to an enterprise hub DNS server.

21 Claims, 4 Drawing Sheets

BRANCH OFFICE DNS STORAGE AND RESOLUTION

BACKGROUND

Modern computer systems allow for the interchange of data and resources through network environments. For example, a modern computer network may include a number of interconnected client computers. The computer network may further include resources. Such resources may be, for example and not limited to, file servers for storing data accessible by the clients, print servers for providing access to printers to the clients, and shared stores on client computers for storing data to be made available to other clients and resources on the network.

Networks vary in size. Smaller networks include Local Area Networks (LANs). Examples of LANs include home networks and small business networks where the network is at a single home or business site. Larger networks include Wide Area Networks (WANs). One common example of a WAN is the ubiquitous Internet. Another example includes a collection of LANs interconnected to create an enterprise network.

When LANs are interconnected to create an enterprise network, each of the LANs may be referred to as being included in a branch office. A branch office provides network data routing functions within the local branch office. An enterprise hub is used to interconnect the branch offices through WAN connections. The enterprise hub includes routing functionality for the enterprise. Typically, an enterprise network is arranged such that all of the clients and resources are within the same namespace. For example, the namespace may be microsoft.com. Host names for the clients and resources on the enterprise network may include for example, client1.microsoft.com, printserver1.microsoft.com, fileserver1.microsoft.com, bill.microsoft.com, tom.microsoft.com, etc.

While modern computer users have become accustom to using host names because they are easy to remember due to their alphanumeric characteristics, clients and resources on a network typically communicate using numerical IP addresses. Thus, a translation mechanism is used to correlate IP addresses with host names. In an enterprise network, a Domain Name System (DNS) server stores a correlation between host names and IP addresses for clients and resources in the enterprise. DNS servers are typically organized into networks such that a request to resolve a host name into an IP address may be handled by a number of DNS servers. Present implementations of DNS servers are divided into two types, authoritative and non-authoritative.

Authoritative DNS servers implement a model that includes primary and secondary servers. Both primary and secondary servers appear as authoritative to clients and resources. However, the secondary DNS servers are not truly authoritative. The secondary DNS servers copy records from their master server. Once the copy is received and loaded, the secondary DNS server treats the data as authoritative. The secondary DNS server responds to queries as if it were a primary server. Illustratively, in the authoritative DNS server model, a DNS server, which may be a secondary DNS server, hosts a zone and is fully authoritative for all data in the zone. If the DNS server receives a query for a host name in the zone, the DNS server will answer using records stored at the local zone. If the requested data is not present in the DNS server, the DNS server will respond with an error message. The authoritative DNS server model may use large amounts of network bandwidth when copying the records from the primary DNS server to secondary DNS servers. Additionally, between copy operations, the local zone may not have access to all valid records if records are updated in the primary DNS server and have not yet been copied to the secondary DNS server.

The non-authoritative model is sometimes referred to as a stub/forwarder model. In this model, a stub/forwarder DNS server handling a zone is fully non-authoritative for all data in the zone. If a stub/forwarder DNS server receives a query for a host name in the zone, the stub/forwarder DNS server will send the query to a master DNS server for resolution. The answer may be cached at the stub/forwarder DNS server, but ultimately, the master DNS server retains authority for all names and records. If a connection between the stub/forwarder DNS server and the master server is non-operational, a stub/forwarder DNS server may not be able to resolve host names, even for hosts (clients and resources) local to the stub/forwarder DNS server. This problem may be exacerbated by reboot and other operations that clear any cached records.

While various issues have been identified in this background, the subject matter claimed below does not necessarily address any or all of the identified issues. This background serves simply to provide background on one exemplary environment where the embodiments described herein may be practiced.

SUMMARY

One embodiment summarized herein includes a method of maintaining records. The method may be practiced, for example, in a computing network system. The computing network system includes a local Domain Name Service (DNS) server connected to one or more local clients or resources at a local branch office in an enterprise network. The method includes advertising to the one or more local clients or resources at the local branch office that the DNS server is authoritative. The method further includes receiving record information for the one or more local clients or resources. An attempt is made to forward the record information to an enterprise hub DNS server. The record information is stored persistently in a cache. Storing the record information persistently in cache may be performed selectively or non-selectively. When performed selectively, the record information is stored or not stored depending on some result or other action.

Another embodiment includes a system for storing record information for clients or resources in a local branch office of an enterprise network. The system includes a branch office. The branch office includes a branch Domain Name Service (DNS) server. The branch DNS server has a persistent cache of record information for clients or resources associated with the branch office. The branch office further includes enterprise network hardware coupled to the branch DNS server. The enterprise network hardware is configured to connect to a network to connect the branch office to an enterprise hub. The branch office further includes local network hardware configured to connect to the clients or resources associated with the branch office. The branch office has computer executable instructions disposed in the branch DNS server that allows the DNS server to advertise through the local network hardware to the clients or resources associated with the branch office that the branch DNS server is authoritative. The computer executable instructions can also allow the DNS server to attempt to forward record update data to the enterprise hub.

Yet another embodiment includes a method of resolving host names. The method may be practiced, for example, in a computing network system that includes a local Domain DNS server connected to one or more local clients or resources at a local branch office. The local branch office may be in an enterprise network. The method includes receiving a request from one of the local clients or resources. The request includes a query including a host name. A local persistent cache is checked to determine if a local record exists to resolve an IP address for the host name. If the local record exists to resolve an IP address for the host name at the local persistent cache, the IP address is sent to the local client or resource requesting resolution. The local persistent cache includes local records for at least a portion of the one or more local clients or resources. If a local record does not exist in the local persistent cache to resolve an IP address for the host name, a local temporary cache is checked to determine if a record exists to resolve the IP address for the host name. If the record exists to resolve the IP address for the host name at the local temporary cache, the IP address is sent to the local client or resource requesting resolution. The local temporary cache includes records for clients or resources outside of the local branch office. If a local record does not exist in the local persistent cache or the local temporary cache to resolve the IP address for the host name an attempt is made to query an enterprise hub to resolve the IP address.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE SEVERAL VIEWS OF THE DRAWINGS

In order that the manner in which the above-recited and other features are obtained, a more particular description will be rendered by reference to specific embodiments thereof which are illustrated in the appended drawings. Understanding that these drawings depict only typical embodiments and are not therefore to be considered limiting of its scope, the embodiments will be described and explained with additional specificity and detail through the use of the accompanying drawings in which.

DETAILED DESCRIPTION

One embodiment described in more detail below includes a branch office that is a part of an enterprise network. The branch office includes a branch DNS server that represents itself to clients and resources connected to the branch DNS server as authoritative. The branch DNS server includes a local persistent cache (e.g. a cache stored in non-volatile memory) that includes records for local clients and resources at the branch office. The records include information for resolving host names to IP address such that clients and resources at the branch office can communicate with other clients and resources at the branch office.

By storing a local persistent cache that appears to be authoritative, local clients and resources can continue to communicate and receive responses to queries to resolve addresses even when connections between the branch office and an enterprise hub are non-operational. Additionally, this embodiment can reduce the amount of network traffic between a branch office and an enterprise hub. Specifically, when resolving local addresses where records stored in the local persistent cache may be used, there is no need to query an enterprise hub to resolve the addresses. Further, the branch DNS server does not need to copy records from the enterprise hub DNS server.

Yet another advantage of the above described embodiment is related to the use of a persistent cache. By caching persistently, failures that may include a reboot of the branch DNS server coupled with the loss of a connection between the branch office and the enterprise hub will not hinder the ability of clients and resources local to the branch office to communicate with one another.

Figure 1:
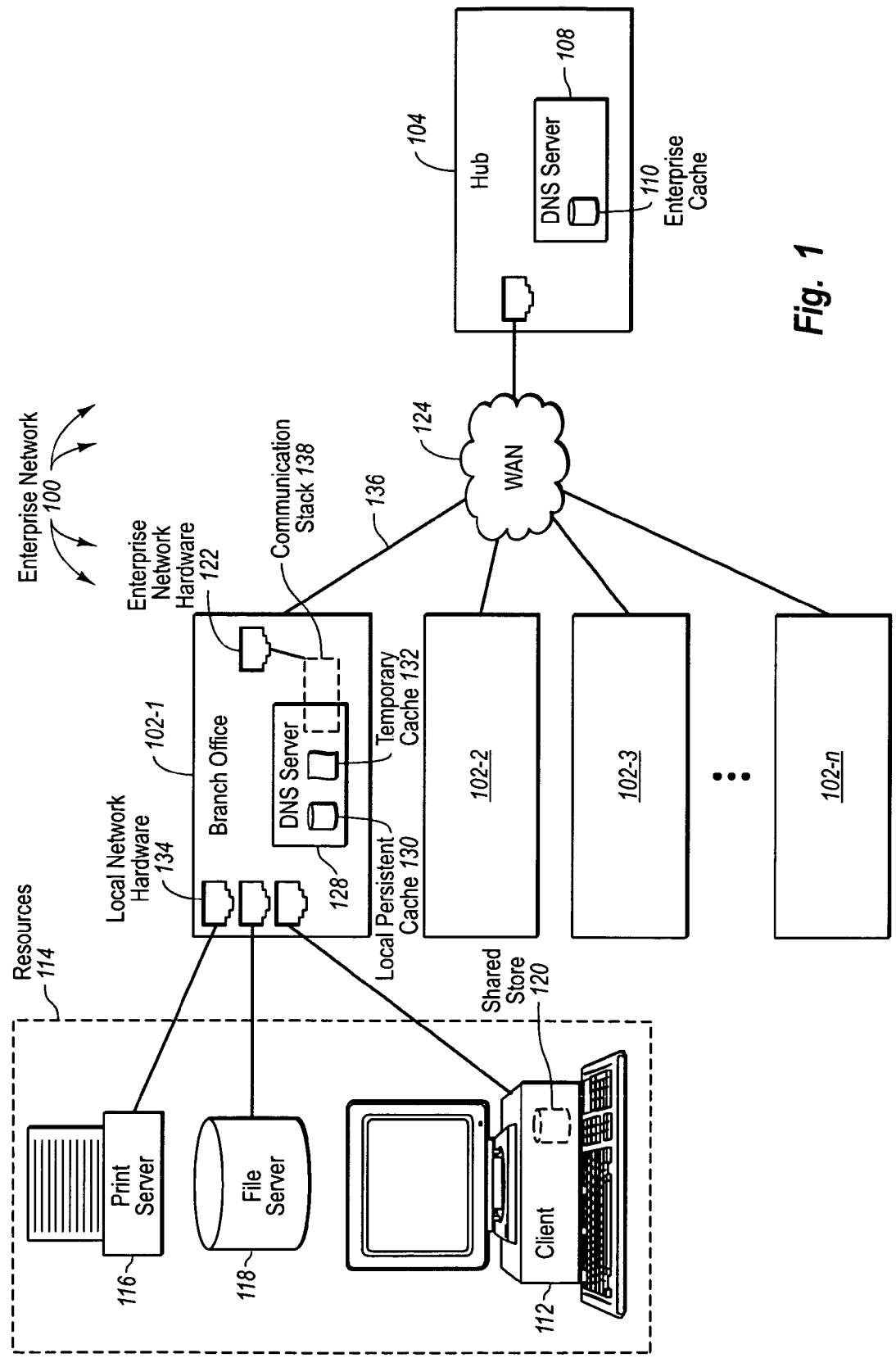
FIG. 1 illustrates a block diagram of an example enterprise network.

Referring now to FIG. 1, a detailed example of one embodiment is illustrated. The example shown in FIG. 1 illustrates an enterprise network 100. The enterprise network 100 includes a number of branch offices 102-1-102-n connected through an enterprise hub 104. The enterprise hub 104 includes an enterprise DNS server 108. The enterprise DNS server 108 stores enterprise records in an enterprise cache 110.

The enterprise records in the enterprise cache 110 contain information that can be used to resolve host names to IP addresses. Specifically, the records contain a correlation of host names to IP addresses. The host names and IP addresses are used to identify clients 112 and resources 114 on the enterprise network 100. Clients 112, as will be discussed in more detail below, may be computer systems connected on the enterprise network that a user may use to access enterprise resources. Resources 114, as will be discussed in more detail below, may include for example, print servers 116 to provide printing functionality for clients and other resources on the enterprise network 100, file servers 118 to provide data storage and data access for clients and other resources on the enterprise network 100, shared stores 120 on a client 112 such that a user can provide access to client data to other resources and clients on the enterprise network 100, etc.

The enterprise DNS server 108 includes functionality to ensure that there are no conflicting host names and IP addresses. In one example, when a client 112 or resource 114 is powered on, the client 112 or resource 114 connects to the enterprise DNS server 108 through a local branch office 102-1 to update record information. Notably, updating record information as used herein may include creating a new record or modifying previously stored data. The client 112 or resource 114 may provide information such as a host name and IP address. The information may be entered by a user or assigned automatically. For example, a user may set the host name of the client 112 to be client1.microsoft.com. Alternatively, information may be assigned automatically such as when a Dynamic Host Configuration Protocol (DHCP) server automatically assigns IP addresses. The enterprise DNS server 108 checks for conflicting information for a record to be updated. For example, if a client 112 or resource 114 attempts to update a record with a host name or IP address being used by another client or resource on the network, the enterprise DNS server 108 will not update the record and will return a failure response. In one embodiment, the enterprise network 100 uses a common domain for all hosts on the enterprise network 100. For example, all hosts may be on a domain named microsoft.com. The enterprise DNS server 108 ensures that each host has a unique name in the domain.

Notably, the enterprise DNS server 108 includes records for clients and resources coupled to each of the branch offices 102-1-102-*n* in the enterprise network 100. While this example includes a single enterprise hub 104, it should be noted that alternative embodiments are not limited to a single enterprise hub. In particular, a number of enterprise hubs may be networked to provide DNS server and other functionality for an enterprise. The enterprise hubs may use any appropriate networking model including authoritative and non-authoritative models.

The branch offices 102-1-102-*n* are connected to the enterprise hub 104 using enterprise network hardware 122 through a wide area network (WAN) 124. A branch office 102-1 includes, for example, a branch DNS server 128. The branch DNS server 128 stores a local persistent cache 130 and a local temporary cache 132. The branch office 102-1 further includes local network hardware 134 to connect to the clients 112 and resources 114.

In the embodiment illustrated, the local persistent cache 130 includes records for local clients 112 and resources 114. The local persistent cache 130, as its name implies, is persistent such that power downs, reboots, power resets, and the like will not clear the local persistent cache 130 of the records stored in the local persistent cache 130. Similar to the enterprise cache 110, the records in the local persistent cache 130 can be used to resolve host names to IP addresses. In contrast to the enterprise cache 110, in this example the local persistent cache 130 stores records not for the entire enterprise network 100, but for the local clients 112 and local resources 114 coupled to the branch office 102-1. Records for clients and services remote to the branch office 102-1, such as those on the remainder of the enterprise network 100, can be stored in the temporary cache 132, the enterprise cache 110 or at other DNS servers. The temporary cache 132 store is designed to "build-up" records over time. For example, the temporary cache 132 stores records in cache when a local client 112 or resource requests records for hosts that exist beyond the branch office 102-1. When a remote DNS server, such as the enterprise DNS server 108, returns an answer containing a host record, the host record will be stored in the temporary cache 132 for future use.

In operation, local clients 112 and resources 114 request a record update to the branch DNS server 128. In one example, the branch DNS server 128, in response to the local request, attempts a request to the enterprise DNS server 108 to update a record in the enterprise cache 110. Three results from the attempt from the branch DNS server 128 are: the enterprise DNS server 108 successfully updates the record, the enterprise DNS 108 fails to update the record, or the connection 136 between the branch office 102-1 and the enterprise hub 104 is non-operational such that the request cannot be transmitted to the enterprise DNS server 108. Each of these results will now be discussed in more detail below.

One possible result of a branch DNS server 128 sending a request to update a record to the enterprise DNS server 108 is that the enterprise DNS server 108 successfully updates the record. If the enterprise DNS server 108 accepts the update, then the enterprise DNS server 108 returns a response to the branch office 102-1 indicating that the record has been updated. The branch DNS server 128 stores the same update to the record at the local persistent cache 130. The enterprise DNS server 108 may use the updated record to check for conflicts when requests for updates are received from branch offices 102-1-102-*n*. Additionally, the enterprise DNS server 108 may use the updated record to resolve addresses when requests are made for such resolution from other branch offices 102-2-102-*n*. At the local branch office 102-1, the branch DNS server includes computer executable instructions that when executed allows the branch DNS server to represent itself as authoritative to the local clients 112 and resources 114. As such the record in the local persistent cache 130 can be used by the branch DNS server 128 to resolve addresses for clients 112 and resources 114 connected locally to the branch office 102-1. In an alternative embodiment, a record may be updated first in the local persistent cache 128 prior to a request being sent to the enterprise DNS server 108.

A second possible result of a branch DNS server 128 sending a request to update a record to the enterprise DNS server 108 is that the enterprise DNS server 108 may fail to update the record in the enterprise cache 110. This may occur because the enterprise DNS server 108 detects a conflict with a pre-existing record or for other various reasons. In this case, the enterprise DNS server 108 sends a response to the branch office 102-1 that the update to the record failed. A response, including an error code, may be returned to the branch office 102-1 and subsequently a response including an error code to the client 112 or resource 114 requesting the update. A record in the local persistent cache 128 is not updated when the response including the error code is received by the branch office 102-1. In an alternative embodiment, a record in the local persistent cache 128 may be updated prior to sending the request for update to the enterprise DNS server 108. When the response including the error code is received, the record in the persistent cache 128 may be invalidated to prevent enterprise network conflicts. Invalidation may include various alternatives such as deleting the record, flagging the record as invalid, etc.

A third possible result of a branch DNS server 128 sending a request to update a record to the enterprise DNS server 108 is that the connection 136 between the branch office 102-1 and the enterprise hub 104 may be non-operational. This results in a communication stack 138 returning a failure response indicating that the request to update cannot be sent to the enterprise DNS server 108. The communication stack 138 is shown as a single discrete component. However, it should be understood that a communication stack can include a compilation of components of several items. The communication stack may include software and firmware on the branch office 102-1, the DNS server 128, the enterprise network hardware 122, and other hardware, firmware, and software. Returning now to the description of the failure response handling, in this case, a record in local persistent cache 130 is updated with the information in the request to update a record. However, the data in the updated record in the local persistent cache 130 is flagged with a maximum lifetime to minimize collision exposure on the enterprise network 100. In an alternative embodiment, the record may be set to expire once the connection 136 between the branch office 102-1 and the enterprise hub 104 is restored to functionality. In yet another alternative embodiment, the branch DNS server 128 may update records in the local persistent cache 130 prior to attempting to forward record update information to the enterprise DNS server 108.

FIG. 1 further illustrates a temporary cache 132 stored on the branch DNS server. The temporary cache 132 may be used to cache record information for other clients and resources on the enterprise network 100. The temporary cache may also store information to assist in resolving addresses outside of the enterprise network 100. For example, the temporary cache may include domain and host names and corresponding IP addresses for resources available on the Internet or on other networks. Therefore, if the enterprise network 100 or branch offices 102-1-102-n include provisions for access to external networks, resources on those external networks can be accessed by reference to information stored at a local temporary cache. Records from the enterprise network 100 can be cached at the local temporary cache when the connection 136 between the branch office 102-1 and the enterprise hub 104 is operational.

Figure 2:
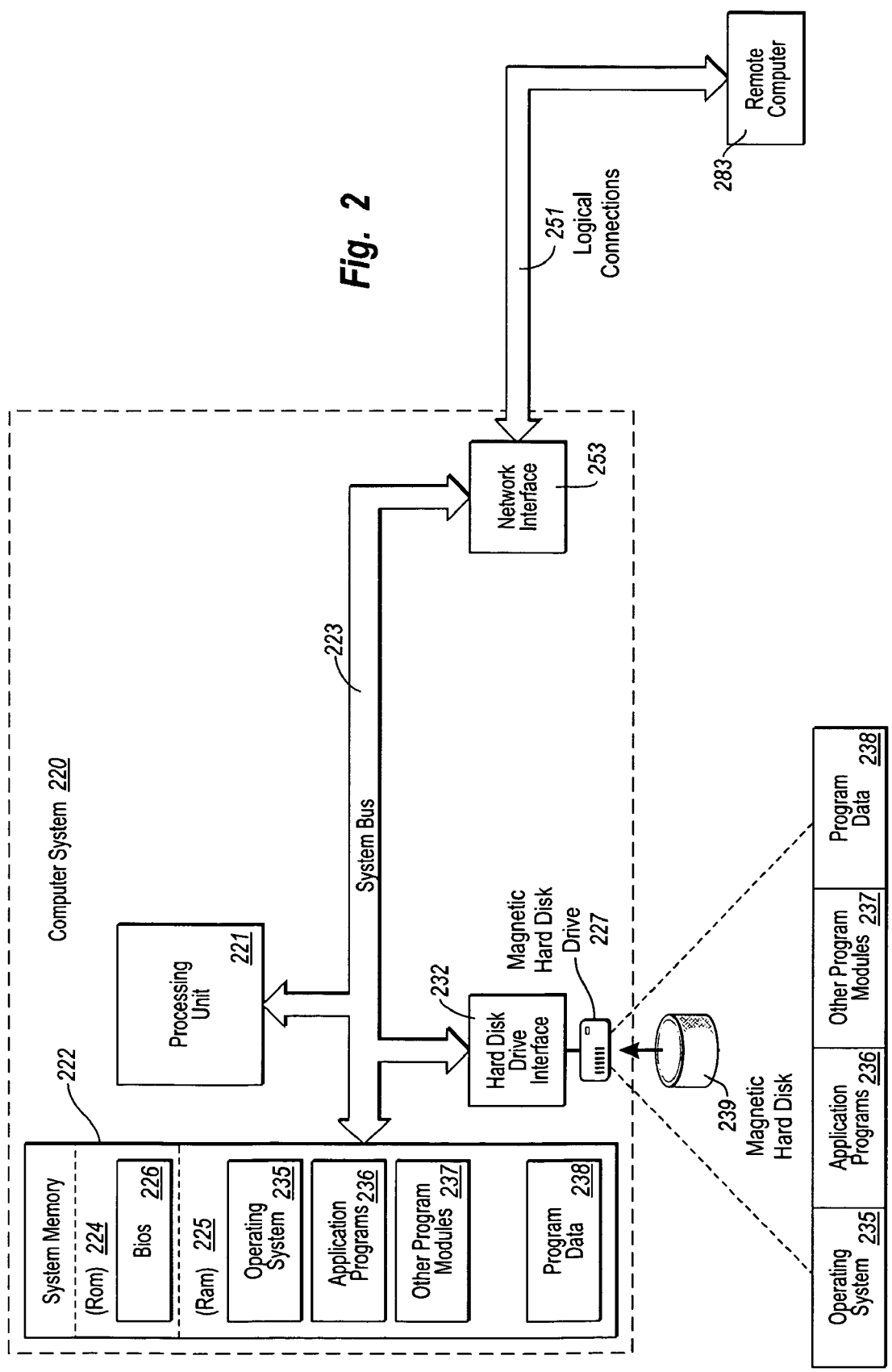
FIG. 2 illustrates a computer system that may be used to implement various aspects of the enterprise network of FIG. 1, including various servers and related equipment.

The branch office 102-1and branch DNS server 128 may be implemented, in one embodiment, by using a computer system such as that outlined in FIG. 2 and designated at 220. With reference to FIG. 2, an exemplary system includes a general or specific purpose computing device in the form of a computer system 220, including a processing unit 221, a system memory 222, and a system bus 223 that couples various system components including the system memory 222 to the processing unit 221.

The system bus 223 may be any of several types of bus structures including a memory bus or memory controller, a peripheral bus, and a local bus using any of a variety of bus architectures. The system memory includes read only memory (ROM) 224 and random access memory (RAM) 225. A basic input/output system (BIOS) 226, containing the basic routines that help transfer information between elements within the computer 220, such as during start-up, may be stored in ROM 224.

The computer system 220 may also include a magnetic hard disk drive 227 for reading from and writing to a magnetic hard disk 239. The magnetic hard disk drive 227, is connected to the system bus 223 by a hard disk drive interface 232. The magnetic hard disk drive 227 and associated computer-readable media provide nonvolatile storage of computer-executable instructions, data structures, program modules and other data for the computer system 220. Although the exemplary environment described herein employs a magnetic hard disk 239, other types of computer readable media for storing data can be used, including magnetic cassettes, flash memory cards, compact disks, digital versatile disks, Bernoulli cartridges, RAMs, ROMs, and the like. Computer readable media may be used in various forms to transfer computer executable instructions to the magnetic hard disk 239 and/or the system memory 222. Further, computer readable media may be accessible via a network as will be discussed in more detail below.

One or more program modules may be stored on the hard disk 239, ROM 224 or RAM 225, including an operating system 235, one or more application programs 236, other program modules 237, and program data 238. For example, application programs 236 and other program modules 237 may be used to implement the DNS servers 108 and 128 described in FIG. 1. In one exemplary embodiment, the application programs 236 and/or other program modules 237 may include computer executable instructions as part of the branch DNS server 108 (FIG. 1) that allows the branch DNS server 108 to advertise through the local network hardware 134 to the clients 112 resources 114 associated with the branch office 102-1 that the branch DNS server 126 is authoritative. The application programs 236 and/or other program modules 237 may further include computer executable instructions as part of the branch DNS server 126 (FIG. 1) that attempt to forward record update data to the enterprise hub 104.

The computer system 220 may operate in a networked environment using logical connections 251 to one or more remote computers, such as remote computer 283. Remote computer 283 may be a personal computer, a server, a router, a network PC, a peer device or other common network node, and typically include many or all of the elements described above relative to the computer 220. In the illustrated embodiment, the remote computer 283 may be the enterprise hub 104 or other related computing device. The logical connections 251 depicted in FIG. 2 may include a local area network (LAN), a wide area network (WAN), or any other appropriate connection. These are presented here by way of example and not limitation.

In a networked environment, program modules depicted relative to the computer 220, or portions thereof, may be stored in remote memory storage devices. Further, computer readable media includes media accessible via a network connection. It will be appreciated that the network connections shown are exemplary and other means of establishing communications over networks may be used.

Several alternative embodiments will now be described which include various method acts. Although the non-functional acts may be described or claimed in a particular order, embodiments described are not necessarily limited to any particular ordering or combination of acts.

Figure 3:
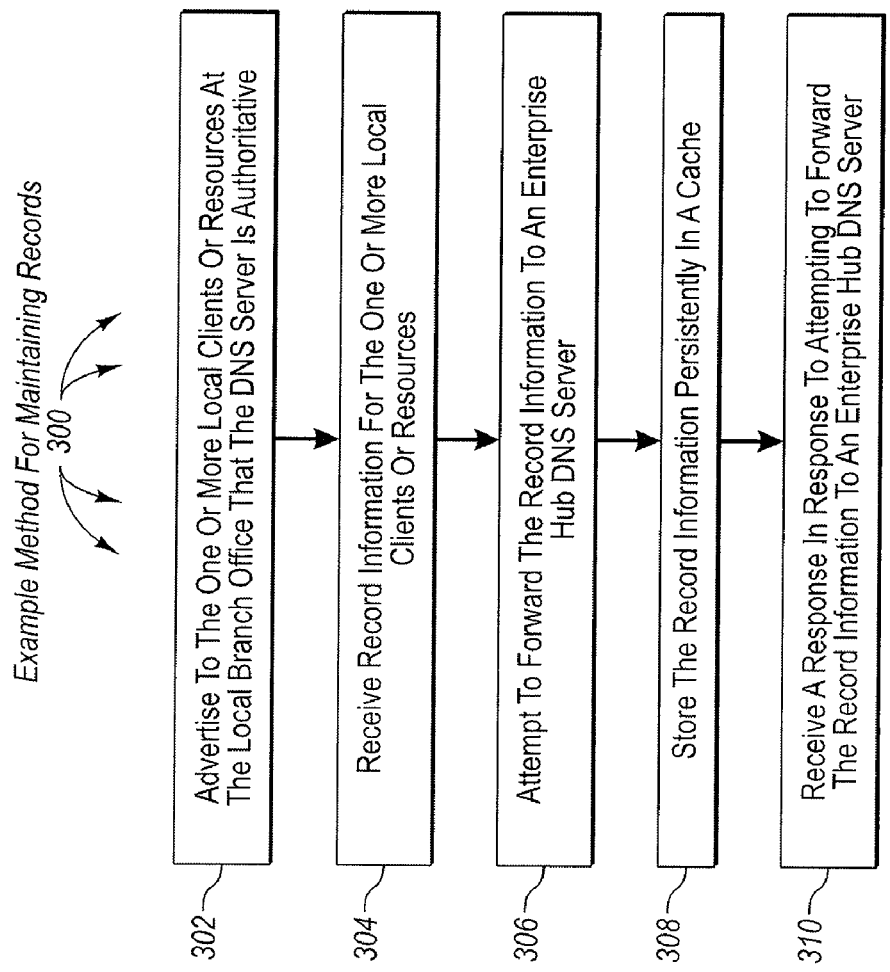
FIG. 3 illustrates a flow-chart illustrating a method for storing record information.

Referring now to FIG. 3, an example method 300 for maintaining records is illustrated. The method 300 may be practiced, for example, in a computing network environment. The computing network environment may be an enterprise network, such as the enterprise network 100 illustrated in FIG. 1. The computing network environment may include a branch DNS server connected to local clients and resources such as is illustrated in FIG. 1. The method 300 may be particularly useful for maintaining record information about the local clients and resources to facilitate resolution of addresses by the branch DNS server.

The method includes an act of advertising to one or more local clients and resources at a local branch that the DNS server is authoritative (act 302). For example, and referring again to FIG. 1, a branch DNS server 102-1 may advertise to clients 112 and resources 114 that the branch DNS server 102-1 is authoritative. The branch DNS server 102-1 may not actually be authoritative, but rather may just represent itself as such. As discussed herein, by representing that it is authoritative, clients 112 and resources 114 will provide updates to the branch DNS server 102-1 and accept replies from requests for resolution from the branch DNS server 102-1.

Referring again to FIG. 3, the method 300 includes an act of receiving record information for the one or more local clients and resources (act 302). Referring again to FIG. 1, the branch DNS server 102-1 may receive record information from a client 112 or resource 114. As described previously, the record information may result in an update to a record. Updating a record may result in creation of a new record as well as modifying existing records in the local persistent cache 130 or the enterprise cache 110.

Referring again to FIG. 3, the method 300 includes an act of attempting to forward the record information to an enterprise DNS server (act 306). As shown in FIG. 1, a branch DNS server 128 attempts to forward the record information, such as a request to update a record, to the enterprise DNS server 108. Three results may occur as a result of attempting to forward the record information to an enterprise DNS server including: a failure response may be generated by a communication stack indicating that a connection between a branch office 102-1 and an enterprise hub 104 is non-operational, a succeed response may be generated by the enterprise DNS server 108 and sent to the branch office 102-1 when a record is successfully updated in the enterprise DNS server 108, and a failure response may be generated by the enterprise DNS server 108 and sent to the branch office 102-1 when a record is not updated due to conflicts or other issues. Each of these results will be discussed in more detail below.

The method 300 may further include an act of storing the record information persistently in a cache (act 308). Storing the record information persistently in a cache may be done either selectively or non-selectively. When storing the record information persistently in a cache is performed selectively, the information is stored or not stored depending on results of the act of attempting to forward the record information to an enterprise DNS server (act 306). For example, FIG. 3 illustrates an act of receiving a response in response to the act of attempting to forward the record information to an enterprise hub DNS server (act 310). Storing (act 308) can be selectively performed, i.e. either an update to a record is performed or not performed, depending on the response received in the act of receiving a response (act 310).

If the response is a failure response from a communication stack indicating that a connection between the local branch office and the enterprise hub is non-operational, the act of storing the record information persistently in cache (act 308) is selectively performed such that the record information is stored in the cache. In other words and referring to FIG. 1, the record is updated in the local persistent cache 130 with the record information. In this case, the method 300 may further include an act of flagging the record information with a maximum lifetime after which the record information expires. Referring now to FIG. 1, this allows a local DNS server 126 to maintain records in the persistent cache 130 for resolving addresses for local clients 112 and resources 114. By flagging the record information with a maximum lifetime, collisions due to duplicate host names and IP addresses are minimized on the enterprise network 100. In one embodiment, flagging may allow the record information to persist in cache until a link between a local branch office 102-1 and an enterprise hub 104 is operational.

Referring again to FIG. 3, if the response received in the act of receiving a response (act 310) is a succeed response from the enterprise hub indicating that the record information has been used to update a record for a client or resource, the act of storing (308) is selectively performed such that the record is updated in the cache. Referring now to FIG. 1, the enterprise DNS server 108 may return a response to the branch office 102-1 indicating that the record information has successfully been used to update a record in the enterprise cache 110. In response to this, the branch DNS server 128 updates the persistent cache 130 to include the record information.

Referring again to FIG. 3, if the response received in the act of receiving a response (act 310) is a failure response from the enterprise hub indicating that the record information has not been used to update a record for a client or resource, the act of storing (308) is selectively performed such that the record is not updated in the cache. This may occur because an enterprise DNS server 108 (FIG. 1) detects a conflict between the record information and existing records in the enterprise cache 110 or for other reasons. If this occurs, the method 300 shown in FIG. 3 may further include an act of sending a failure response to a local client or resource that sent the record information received in the act of receiving record information for the one or more local clients or resources. For example, and referring again to FIG. 1, if a branch office 102-1 receives a failure message from the enterprise hub 104 indicating that a record update could not be performed with the record information, the branch DNS server 128 may send a message to the client 112 or resource 114 that provided the record information.

Notably, while the acts shown in FIG. 3 are shown in a particular order, the order does not necessarily need to be performed chronologically. When recited in an order, that order does not limit the method to that particular order. Specifically, in the example where storing the record information persistently in a cache (act 308) is performed selectively, that step may actually be performed after receiving a response (act 310) to enable the selectivity of the act of storing (act 308).

As described above, the act of storing the record information persistently in a cache (act 308) may be done non-selectively. In other words, the record information is always updated in a local persistent cache. In one alternative embodiment, storing the record information persistently in a cache (act 308) such that the record information is updated is performed in response to receiving record information for the one or more local resources (act 304). The record information stored persistently in a cache can then be invalidated or flagged with a maximum lifetime for failure responses received in response to the act of attempting to forward the record information to an enterprise hub DNS server (act 310). For example, if the record information is stored persistently in cache (act 308), followed by receiving a response (act 310) where the response is a failure response from the enterprise hub indicating that the record information may not be used to update a record for a resource, the method may include an act of invalidating the record information stored persistently in the cache. Invalidating may include removing data, flagging it as not valid, or any other appropriate action. The method may further include an act of sending a failure response to a local client or resource that sent the record information. If the record information is stored persistently in cache (act 308), followed by receiving a response (act 310) where the response is a failure response from a communication stack indicating that a connection between the local branch office and the enterprise hub is non-operational, the method may include an act of flagging the record information stored persistently in the cache with a maximum lifetime.

Figure 4:
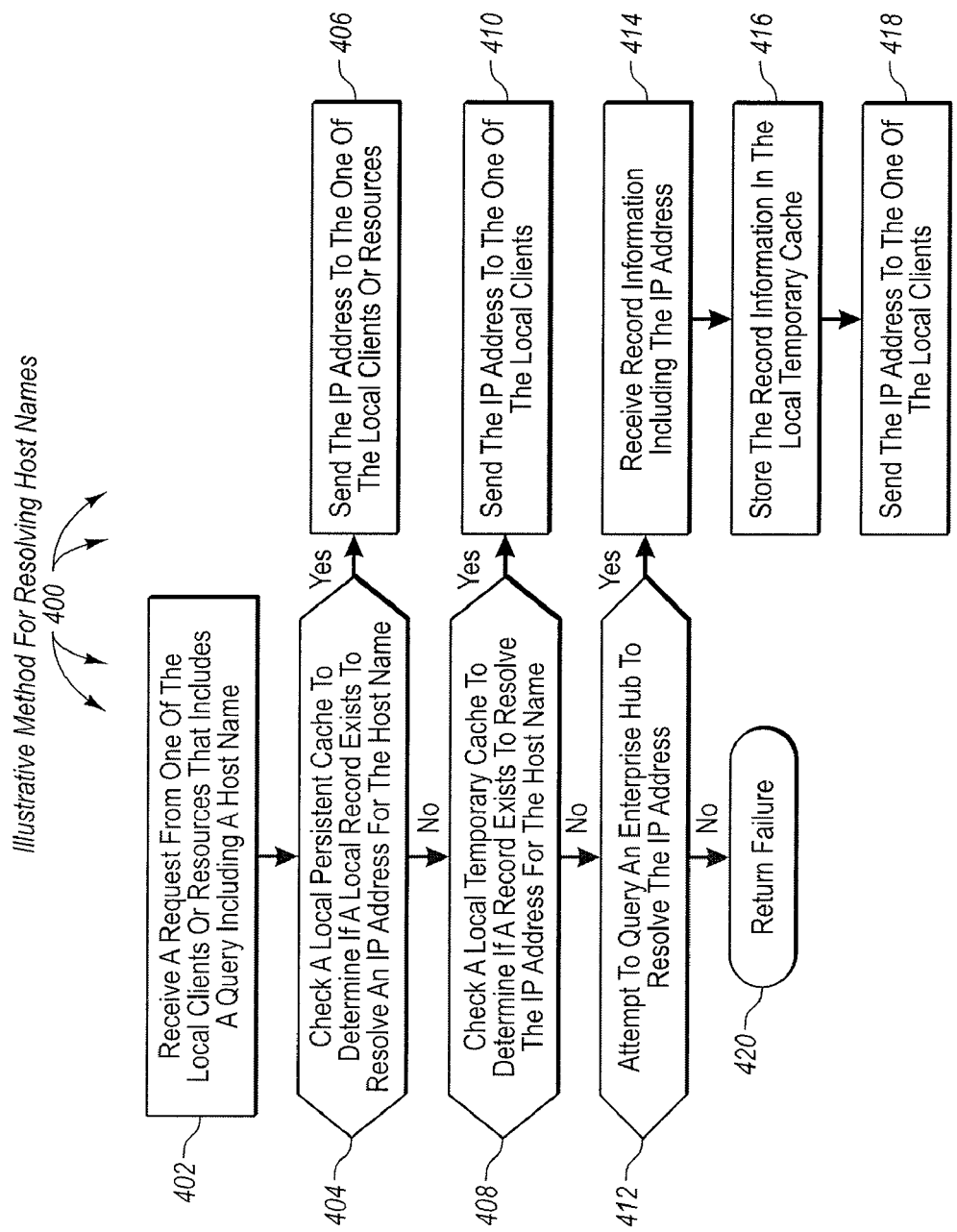
FIG. 4 illustrates a flow-chart illustrating a method for resolving IP addresses.

Referring now to FIG. 4, a method 400 is illustrated for resolving host names. The method illustrated is, in this example, practiced in a computing network system that includes a local DNS server. The DNS server is connected to one or more local clients or resources at a local branch office of an enterprise network similar to what is illustrated in FIG. 1.

The method 400 includes receiving a request from one of the local clients or resources that includes a query including a host name (act 402). The query may be a request for resolution of an IP address for the host such that communications can be conducted between the client or resource and the host.

The method 400 further includes an act of checking a local persistent cache to determine if a local record exists to resolve an IP address for the host name (act 404). Referring to FIG. 1, an example of a device performing this act might include the branch DNS server 128 checking the local persistent cache 130 for a record containing the host name and a corresponding IP address. If a record exists for the host name, the corresponding IP address is sent to the local client or resource that sent the request (act 406). For example and referring again to FIG. 1, the branch DNS server 128 may send an answer to a client 112 or resource 114 with the IP address.

If a local record does not exist in the local persistent cache to resolve an IP address for the host name, the method 400 includes checking a local temporary cache to determine if a record exists to resolve the IP address for the host name (act 408). For example, and referring again to FIG. 1, the branch DNS server 126 checks the local temporary cache 132 for records containing the host name and the corresponding IP address. If the record exists in the local temporary cache, the method 400 includes an act of sending the IP address to the local client or resource that requested the resolution (act 410). Referring to FIG. 1, an example of act 410 can be illustrated when the branch DNS server 126 sends an answer with an IP address to one of the clients 112 or resources 114.

If a local record does not exist in the local persistent cache or the local temporary cache, the method 400 includes an act of attempting to query an enterprise hub to resolve the IP address (act 412). Referring to FIG. 1, this can be illustrated when a branch office 102-1 queries the enterprise hub 104 for records that may be stored in the enterprise cache 110. Notably, as mentioned above, alternative embodiments exist where multiple enterprise hubs and caches are used. A record in any one of the multiple caches can be used to resolve the host name.

The enterprise hub 104 may return an answer with a resolution of the IP address. In this case, the method 400 includes an act of receiving record information including the IP address (act 414). For example, in FIG. 1, the branch office 102-1 may receive an answer from the enterprise hub 104. The method further includes an act of storing the record information in the local temporary cache (act 416). For example, in FIG. 1, the branch DNS server 128 may store record information received from the enterprise hub 104 in the local temporary cache 132. The method 400 further includes provisions for sending the IP address to the one of the local clients (act 418) in a fashion similar to that described previously herein. If an IP address resolution cannot be obtained, the method 400 includes provisions for returning a failure (act 420). For example in FIG. 1, the branch DNS server 128 may return a failed answer to the client 112 or resource 114.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

What is claimed is:

1. In a computing network system that includes a local Domain Name Service (DNS) server connected to one or more local clients or resources at a local branch office in an enterprise network, wherein the local DNS server comprises both a local temporary DNS cache and a local persistent DNS cache, a method of maintaining, in the local persistent DNS cache of the local DNS server, records that can be used to resolve IP addresses for host names of the one or more local clients or resources, wherein resolving the IP addresses for the host names of the one or more local clients or resources occurs at the local DNS server, the method comprising:

the local DNS server advertising to the one or more local clients or resources that the DNS server is authoritative;

the local DNS server receiving local DNS record information from the one or more local clients or resources, wherein the local DNS record information comprises information to resolve the IP addresses for the host names of the one or more local clients or resources;

the local DNS server storing the local DNS record information in the local persistent DNS cache that is maintained by the local DNS server, wherein storing the local DNS record information in the local persistent DNS cache may be performed selectively or non-selectively, and wherein the local persistent DNS cache provides persistent local access to the local DNS record information, such that in the event of a power outage coupled with a loss of connection between the branch office and the enterprise hub DNS server, the local DNS information records that are stored in the local persistent DNS cache remain accessible to the local clients and can be used for IP address resolution even while the branch office is disconnected from the enterprise hub DNS server; and the local DNS server attempting to forward the local DNS record information to an enterprise hub DNS server.

2. The method of claim 1, wherein the local DNS server storing the record information in the local persistent DNS cache is selectively performed based on a response received as a result of the local DNS server attempting to forward the record information to the enterprise hub DNS server, the method further comprising:

the local DNS server receiving the response attempting to forward the record information to the enterprise hub DNS server.

3. The method of claim 2, wherein the response is a failure response from a communication stack indicating that a connection between the local branch office and the enterprise hub is non-operational, wherein the local DNS server storing the record information in the local persistent DNS cache is selectively performed such that the record information is stored in the local persistent DNS cache, the method further comprising:

the local DNS server flagging the record information with a maximum lifetime after which the record information expires.

4. The method of claim 2, wherein the response is a succeed response from the enterprise hub indicating that the record information has been used to update a record for a client or resource, wherein the local DNS server storing the record information in the local persistent DNS cache is selectively performed such that the record information is stored in the local persistent DNS cache.

5. The method of claim 2, wherein the response is a failure response from the enterprise hub indicating that the record information may not be used to update a record for a client or resource, wherein the local DNS server storing the record information in the local persistent DNS cache is selectively performed such that the record information is not stored in the local persistent DNS cache, the method further comprising:

the local DNS server sending the failure response to a local client or resource that sent the record information received by the local DNS server.

6. The method of claim 1, wherein the local DNS server storing the record information in the local persistent DNS cache is non-selectively performed, the method further comprising:

the local DNS server receiving a response in response to the act of attempting to forward the record information to the enterprise hub DNS server.

7. The method of claim 6, wherein the response is a failure response from the enterprise hub indicating that the record information may not be used to update a record for a client or resource, the method further comprising:

the local DNS server invalidating the record information stored in the local persistent DNS cache; and the local DNS server sending the failure response to a local client or resource that sent the record information received in the act of receiving record information for the one or more local clients or resources.

8. The method of claim 6, wherein the response is a failure response from a communication stack indicating that a connection between the local branch office and the enterprise hub is non-operational, the method further comprising:

the local DNS server flagging the record information with a maximum lifetime after which the record information expires.

9. The method of claim 1, wherein the record information includes an IP address.

10. The method of claim 1, wherein the local DNS server and the enterprise hub are in a common domain namespace.

11. The method of claim 1, further comprising the local DNS server caching remote DNS records for remote names when a connection between the local branch office and the enterprise hub is operational.

12. At least one computer-readable storage medium having thereon stored computer-executable instructions that, when executed by one or more processors of a computing system, cause the computing system to perform the method recited in claim 1.

13. A system for storing local DNS record information for clients or resources in a local branch office of an enterprise network, the system comprising:
  a branch office, wherein the branch office comprises:
    a branch Domain Name Service (DNS) server, the branch DNS server comprising a persistent DNS cache of the local DNS record information for one or more local clients or resources associated with the branch office and a temporary DNS cache of DNS record information for clients or resources located outside the branch office, wherein the local DNS record information comprises information to resolve IP addresses for host names of the one or more local clients or resources, and wherein the persistent DNS cache provides persistent local access to the local DNS record information, such that in the event of a power outage coupled with a loss of connection between the branch office and an enterprise hub, the local DNS information records that are stored in the persistent DNS cache remain accessible to local clients and can be used for IP address resolution even while the branch office is disconnected from the enterprise hub;
    enterprise network hardware coupled to the branch DNS server and configured to couple to a network to connect the branch office to the enterprise hub;
    local network hardware coupled to the branch DNS server and to the one or more local clients or resources; and
    computer executable instructions disposed in the branch DNS server that allow the branch DNS server to advertise through the local network hardware to the one or more local clients or resources that the branch DNS server is authoritative, to receive the local DNS record information for the one or more local clients or resources, to attempt to forward record update data to the enterprise hub, and to maintain the persistent DNS cache of the local DNS record information for the one or more local clients or resources.

14. The system of claim 13, wherein the one or more local clients or resources comprise a file server.

15. The system of claim 13, wherein the one or more local clients or resources comprise a print server.

16. The system of claim 13, wherein the one or more local clients or resources comprise a shared store on a client computer.

17. The system of claim 13, wherein the enterprise network hardware is coupled to a communication stack that is configured to generate a failure message when attempts to forward record information to the enterprise hub cannot be completed because a link between the branch office and the enterprise hub is non-operational.

18. In a computing network system that includes a local Domain Name Service (DNS) server connected to one or more local clients or resources at a local branch office in an enterprise network, a method of resolving host names, the method comprising:
  the local DNS server receiving a request from one of the local clients or resources, the request comprising a query that includes a host name;
  the local DNS server checking a local persistent DNS cache to determine if a local DNS record exists to resolve an IP address for the host name, and
    wherein if the local DNS record exists in the local persistent DNS cache to resolve an IP address for the host name, the local DNS server sending the IP address to the one of the local clients or resources, wherein the local persistent DNS cache includes local DNS records for at least one of the one or more local clients or resources, and wherein the local persistent DNS cache provides persistent local access to the local DNS records, such that in the event of a power outage coupled with a loss of connection between the branch office and an enterprise hub DNS server, the local DNS records that are stored in the local persistent cache remain accessible to the local clients and can be used by the local DNS server for IP address resolution even while the branch is disconnected from the enterprise hub DNS server; and
  wherein if a local record does not exist in the local persistent DNS cache to resolve an IP address for the host name, the local DNS server checking a local temporary DNS cache to determine if a record exists to resolve the IP address for the host name; and
    wherein if the record exists in the local temporary DNS cache to resolve the IP address for the host name, the local DNS server sending the IP address to the one of the local clients or resources, wherein the local temporary DNS cache includes records for clients or resources outside of the local branch office; and
    wherein if a local record does not exist in the local persistent DNS cache or the local temporary DNS cache to resolve the IP address for the host name, the local DNS server attempting to query the enterprise hub DNS server to resolve the IP address.

19. The method of claim 18, further comprising: the local DNS server receiving record information including the IP address in response to attempting to query an enterprise hub to resolve the IP address;
  the local DNS server storing the record information in the local temporary cache; and
  the local DNS server sending the IP address to the one of the local clients.

20. The method of claim 1, wherein, in addition to the local DNS server receiving the local DNS record information from the one or more local clients or resources and storing the local DNS record information in the local persistent DNS cache, the method further comprises:
  the local DNS server receiving DNS record information from the enterprise hub DNS server corresponding to DNS record information for clients or resources located outside the branch office, and
  the local DNS server storing the DNS record information corresponding to the clients or the resources located outside the branch office in the temporary DNS cache such that it can be retrieved by the local clients or resources for resolution of lip addresses for host names of the clients or resources located outside the branch office.

21. The method of claim 1, further comprising:

the local DNS server receiving a request from the one of the local clients or resources, the request comprising a query that includes a host name;

the local DNS server checking the local persistent DNS cache to determine if a local DNS record exists to resolve an IP address for the host name, and wherein if the local DNS record exists in the local persistent DNS cache to resolve an IP address for the host name, the local DNS server sending the IP address to the one of the local clients or resources; and wherein if a local record does not exist in the local persistent DNS cache to resolve an IP address for the host name, the local DNS server checking the local temporary DNS cache to determine if a record exists to resolve the IP address for the host name; and wherein if the record exists in the local temporary DNS cache to resolve the IP address for the host name, the local DNS server sending the IP address to the one of the local clients or resources, wherein the local temporary DNS cache includes records for clients or resources outside of the local branch office; and wherein if a local record does not exist in the local persistent DNS cache or the local temporary DNS cache to resolve the IP address for the host name, the local DNS server attempting to query the enterprise hub DNS server to resolve the IP address.

* * * * *